June 12, 1956  O. TROGDON ET AL  2,750,210
HOSE COUPLING WITH BRAIDED GRIPPING SLEEVE
Filed Dec. 17, 1952  3 Sheets-Sheet 1

INVENTORS
OLIN TROGDON &
BY ROBERT E. HEROLD

ATTORNEYS

June 12, 1956  O. TROGDON ET AL  2,750,210
HOSE COUPLING WITH BRAIDED GRIPPING SLEEVE
Filed Dec. 17, 1952  3 Sheets-Sheet 2

*INVENTORS*
OLIN TROGDON &
BY ROBERT E. HEROLD

ATTORNEYS

June 12, 1956 O. TROGDON ET AL 2,750,210
HOSE COUPLING WITH BRAIDED GRIPPING SLEEVE
Filed Dec. 17, 1952 3 Sheets-Sheet 3

INVENTORS
OLIN TROGDON &
BY ROBERT E. HEROLD

ATTORNEYS

United States Patent Office 2,750,210
Patented June 12, 1956

2,750,210

HOSE COUPLING WITH BRAIDED GRIPPING SLEEVE

Olin Trogdon, Shaker Heights, Ohio, and Robert E. Herold, Meadville, Pa.

Application December 17, 1952, Serial No. 326,442

5 Claims. (Cl. 285—77)

This invention relates to hose couplings and in particular to rigid couplings adapted to be connected to the end of flexible rubber or rubber-like hose.

A pressure tight connection between a flexible hose and a rigid coupling member is difficult to make because the hose characteristically tends to expand and/or otherwise move relative to the rigid member in response to the pressure or changes in pressure within the hose. This tendency of flexible hose to decouple itself becomes more pronounced in medium and high pressure systems which handle fluids, both liquids and gases, at pressures ranging from 700 p. s. i. to 2500 p. s. i. or higher. The problem of establishing and maintaining an effective pressure seal is also the more difficult to solve where the hose is relatively soft, thick and less firmly reinforced as, for example, with so-called low pressure hoses which handle fluids at pressures less than 700 p. s. i.

The coupling of hose constructed with a reinforcement having a low modulus of elasticity, such as glass braid, is also difficult to accomplish inasmuch as the act of crimping or otherwise deforming the hose to effect an internal seal and to cause the coupling to mechanically grip the hose, also breaks or tends to break the reinforcing braid. Also, hose constructed with specially compounded inner tubes or liners such as Butyl rubber, for resisting the corrosive effects of certain fluids and having a low tear resistance, also presents difficulties with regard to coupling by methods based upon trapping the inner tube to effect a pressure seal and/or upon crimping of the coupling member to grip the hose and hold same against end thrust. Such coupling methods cause the inner tube of this hose to tear.

The practice of making flexible hose connections in the past has been to mechanically compress and constrict the wall of the flexible hose tightly against the rigid coupling member or insert or nipple connected thereto disposed in the end of the hose and to rely upon such constriction to effect a seal. However, the very nature of the flexible hose, that is, its characteristic resilience and readiness to "cold flow," works against the efficiency of this type of seal. In addition, solft flexible hose subjected to highly concentrated constricting forces tends to become weakened and to fracture at the place of maximum stress. The problem of maintaining an effective pressure seal becomes even more acute under conditions of service with higher pressures or where the pressures change sharply so as to induce "working" of the hose wall in the vicinity of the concentrated high pressure zone thereby tending to impair if not destroy the seal.

A general object of our invention is the provision of a flexible hose coupling in which the above noted difficulties are overcome. More specifically, an object of our invention is the provision of a flexible hose coupling in which the seal between the hose and coupling member is substantially unimpaired by radial expansion or other movement of the hose under pressure relative to the coupling. Another object is the provision of a flexible hose coupling which permits the hose to be sealed to a rigid coupling member without necessitating initial highly concentrated constriction of the hose wall such as causes or tends to cause substantial "cold flowing" of the hose and substantial reduction of the wall thickness of the hose.

A further object is the provision of a flexible hose coupling which permits the hose to be quickly and easily detached and reassembled and yet is able to successfully withstand relatively high working pressures. Another object is the provision of a hose coupling with a separate resilient sealing member detachably connected to the coupling member and which may be quickly and conveniently replaced if desired or necessary. A further object is the provision of a flexible hose coupling constructed with a separate internal sealing member which seals the coupling with a force directly proportional to the working pressure in the hose.

Another object is the provision of a coupling for relatively soft flexible thick-walled rubber or rubber-like hose with which an effective mechanical connection and pressure-tight seal between the rigid coupling parts and the hose can be made without deleteriously deforming the hose wall. A further object is the provision of a hose coupling having an external cover or braid or reinforcement made of material having a low modulus of elasticity and means for securing said cover or braid to the rigid parts of the coupling without damaging the former. Another object is the provision of a coupling for flexible hose having an inner tube with low tear resistance characteristics, the coupling making an effective mechanical and pressure-tight connection with the hose without damaging same and/or the inner tube. A further object is the provision of a detachable coupling for rubber or rubber-like hose including relatively soft and thick walled hose which may be repeatedly assembled and disassembled without damage to the hose structure and without impairing the efficiency of the mechanical connection and pressure seal between the hose and rigid parts of the coupling. Another object is the provision of a flexible hose coupling that is strong, economical to make, and durable.

These and other objects of our invention will become apparent from the following description of preferred embodiments thereof, reference being had to the accompanying drawings.

Figure 5:
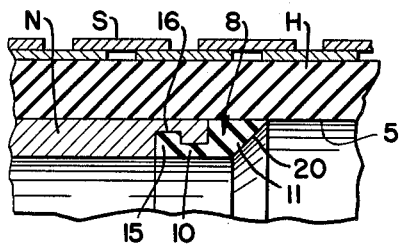
Figure 5 is a section similar to Figure 4 showing the coupling parts after assembly and before fluid under pressure is introduced into the hose.

Figures 7 to 10, inclusive, are enlarged fragmentary longitudinal sections similar to Figure 5 showing modified forms of the sealing member portion of the coupling and omitting the hose.

Figure 11:
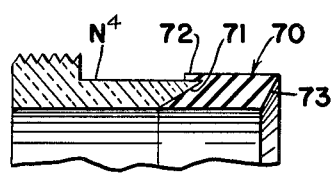

Figure 11 shows a modified form of the sealing member molded to the nipple.

Figure 12:
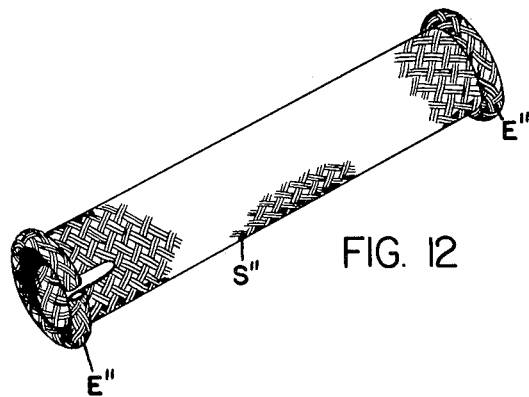

Figure 12 shows another modified form of braided sleeve which is embodied in our invention.

Figure 13:
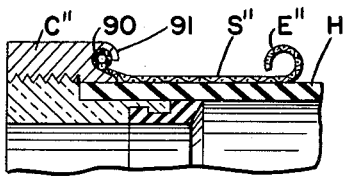

Figure 13 is a longitudinal section of the assembled coupling showing the connection of the braided sleeve of Figure 12 to the rigid member.

Figure 14:
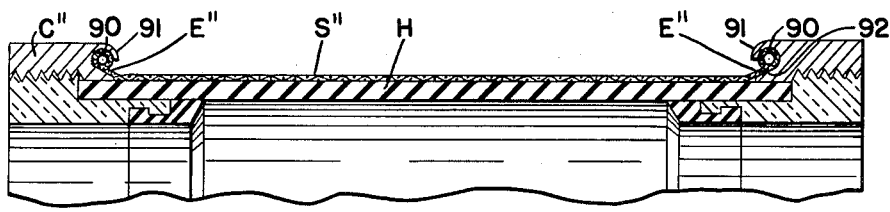

Figure 14 is a fragmentary longitudinal section showing a modified form of our invention in which the braided sleeve extends over the entire length of the hose.

Figure 1:
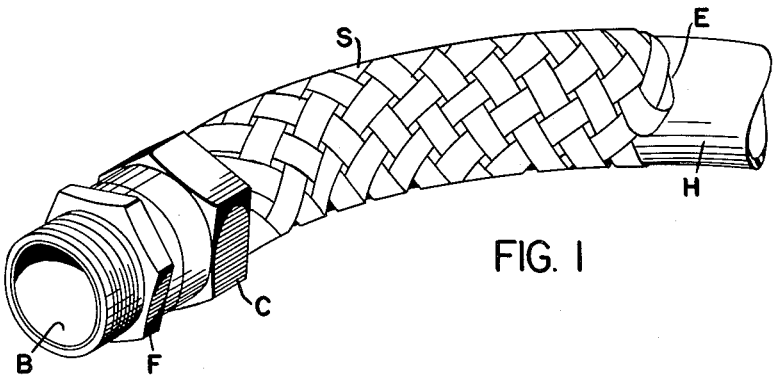
Figure 1 is a perspective view of a hose coupling embodying our invention together with a length of flexible hose connected thereto.
Figure 2:
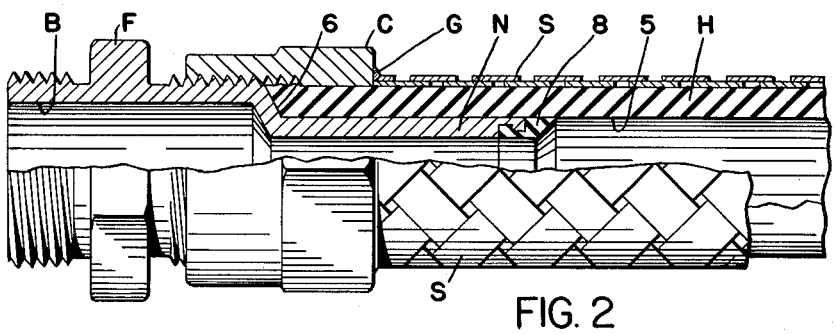
Figure 2 is a view of the coupling partly in section and partly in elevation.

Referring now to the drawings and in particular to Figures 1 and 2, the coupling embodying our invention includes a rigid coupling member or head F having a central bore B and a longitudinally extending tubular insert or nipple N which is adapted to fit inside the bore 5 of a flexible rubber or rubber-like hose H connected to the coupling. When assembled with the coupling member F, hose H completely surrounds the nipple N and the end of the hose abuts against an annular exterior shoulder or end surface 6 on the member F.

The member F is mechanically connected to the hose preferably by means of an expansible and contractile braided sleeve S which is adapted to surround and grip the outside surface of the hose and which preferably is longer than and coaxial with the nipple N. One end E of the sleeve S is free and unattached while the other end G is secured as by brazing to a nut C which has threads for engaging cooperating threads on the member F for fastening the parts together. The braided or interwoven construction of the sleeve S permits it to contract radially upon elongation and to expand or increase in diameter when longitudinally compressed or shortened. When the coupling is assembled and prior to subjecting the assembly to the working pressure of the fluid it carries, the sleeve S preferably is initially elongated relative to the hose by the action of screwing the member F into nut C while the free end E of the sleeve is held stationary. As the sleeve S elongates it exerts an inwardly directed radial force on hose H throughout the length of the sleeve, this force being proportional to the amount of elongation of the sleeve. Thereafter when the coupling is subjected to the working pressure of the fluid carried within the hose, the tendency of the pressure to blow the hose off the coupling member in effect tends to cause the sleeve S to further elongate and contract on and grip the hose more tightly and thereby resist further longitudinal movement of the fitting relative to the hose. Resistance to decoupling afforded by sleeve S therefore is substantially proportional to the pressure carried within the hose.

A pressure tight connection between the hose H and the coupling member is made and maintained preferably by means of a resilient expansible hollow substantially cylindrical sealing member or grommet 8 supported on the innermost, rightward as viewed in Figure 2, end of the nipple N. The sealing member 8 preferably is detachably connected to the end of the nipple and extends beyond the end of the nipple in engagement with the interior surface of the bore 5 of the hose. The sealing member 8 in response to the working or service pressure carried by the hose tends to expand radially outwardly into fluid tight engagement with the bore of the hose thereby effectively sealing the end of the nipple against the hose wall and providing an efficient seal for the coupling.

Figure 4:
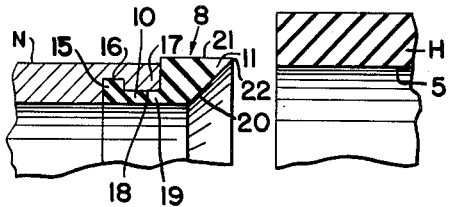
Figure 4 is an enlarged fragmentary longitudinal section showing parts of the coupling and hose prior to assembly of these parts.

The nipple N preferably is cylindrical and has an external diameter substantially the same as or slightly larger than the internal diameter of the bore 5 of the hose so that the hose will snugly engage the nipple when the latter is inserted into the bore of the hose. The external diameter of sealing member 8 preferably is slightly larger than the diameter of the bore 5 of the hose, see Figure 4, so that the sealing member will be pre-compressed when inserted along with the nipple into the bore of the hose thereby initially establishing a tight seal with the hose H even in the absence of pressure in the hose.

In the form of our invention shown in Figures 2, 4, 5 and 6, the sealing member 8 when assembled and supported on the end of the nipple has supported portion 10 which is disposed within and extends around and in contact with the interior of the nipple and an unsupported portion 11 constituting a resilient nipple extension which projects beyond the end of the nipple. The innermost, leftward as viewed, end of the supported portion 10 of the sealing member 8 preferably is formed with an annular radially outwardly extending rib 15 which fits into a corresponding annular groove 16 formed in the wall of the nipple and thus the sealing member 8 is held securely in position on the end of the nipple. In order to minimize restriction of the flow of fluid through the coupling, the end section 17 of the nipple is counterbored at 18 to a radial depth equal to the thickness of the sealing member 8 at 19. Thus the inner diameter of sealing member 8 and the internal diameter of the nipple are substantially the same and flow through the coupling is not impeded or otherwise deleteriously affected by the presence of the sealing member.

Figure 6:
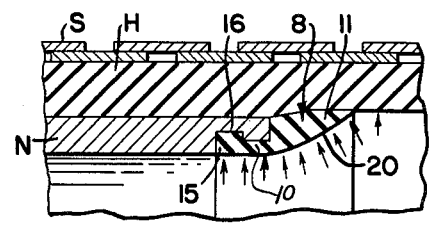
Figure 6 is a section similar to Figure 5 showing the parts of the assembled coupling when subjected to high pressure.

The unsupported portion 11 of the sealing member 8 preferably has a conically shaped outwardly tapering inner end surface 20 which merges at its outer edge 22 with the external surface 21 of the sealing member. This outwardly tapered end of the sealing member 8 causes it to expand outwardly uniformly and tightly against the hose wall in response to the fluid pressure in the hose thereby preventing escape of fluid between the sealing member and the hose. As shown in Figure 6, the unsupported portion 11 tends to elongate and bend around the end of the nipple in response to fluid pressure, indicated by the arrows, and thus the initial conical shape of the end of the sealing member enhances the self-sealing action of the member 8.

The hose H under the influence of the working pressure of the fluid it carries tends to expand radially outwardly, see Figure 6, and also to move longitudinally away from or "blow off" the nipple. Such action or reaction of the hose in response to the service pressure would normally tend to separate the hose from the inner sealing member and destroy the pressure seal. However, this undesirable effect is averted with our sealing member 8 since the unsupported portion 11 thereof actually follows the radial expansions and contractions as well as the longitudinal movements of the hose and bends around the outer extremity of the nipple N as shown in Figure 6 to maintain the continuous tight pressure seal against the interior of the hose wall.

Not only does the sealing member 8 make a tight seal with the portion of the hose immediately beyond the end of the nipple but it also makes a correspondingly tight pressure responsive seal with the end portion of the rigid nipple. The inner surface of the annular rib 15 on the member 8 is fully exposed to the pressure carried in the hose and hence is forced radially outwardly into and against the annular groove 16 formed in the nipple with a force directly proportional to the pressure in the hose. Thus the escape of fluid between the sealing member and the nipple is effectively blocked. The seal we have thus provided is fluid tight and is substantially unaffected by radial expansion or longitudinal movement of the hose with respect to the nipple. One of the advantages of this type of sealing member is that only a minimum of machining of the nipple is required; it being only necessary to counterbore same and form the annular groove 16.

The sleeve S which surrounds and grips the exterior of the hose wall cooperates with sealing member 8 and enhances the fluid seal of the coupling by limiting the amount of radial and longitudinal movement of the hose with respect to the coupling. That is to say, the sleeve S directly resists radial expansion of the portion of the hose it circumscribes including the portion of the hose in which sealing member 8 is disposed. Furthermore the sleeve S, by reason of its braided construction, contracts upon elongation and thus constitutes a mechanical gripping means which exerts a constraining inwardly directed gripping force over a relatively large area of the exterior of the hose and effectively connects the hose to the coupling proper. The initial slight longitudinal movement of the hose with respect to the coupling which occurs when the working pressure first builds up in the hose, that is, when the hose tends to "blow off," is immediately arrested and limited by the gripping action of the braided sleeve S; and the greater the working pressure of the fluid within the hose, the greater will be the "blow off" pressure and the more tightly the sleeve S will grip and hold the hose H to the coupling. Thus the mechanical forces tending to resist radial expansion and longitudinal movement of the hose are directly proportional to the working or service pressure within the hose and cooperate with the sealing member 8 to make the coupling mechanically strong and fluid tight.

Figure 3:
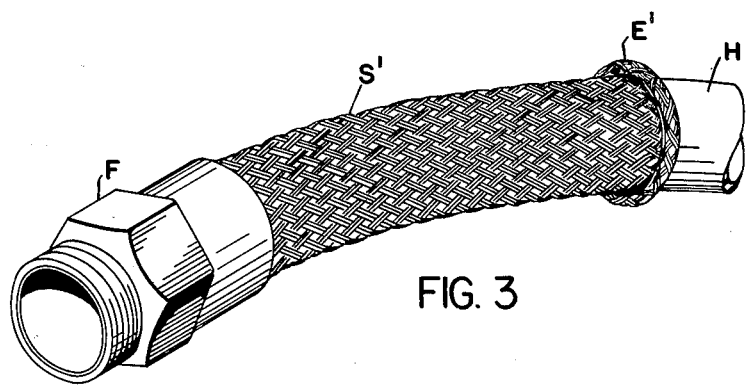
Figure 3 is a perspective view similar to Figure 1 showing a modified form of braided sleeve.

An important advantage of the above described hose coupling is that the hose may be quickly and conveniently detached from the hose and reassembled therewith. In other words, we have provided a hose coupling for so called "high pressure" and "low pressure" flexible rubber or rubber-like hose that does not require permanent connection of the hose and the coupling. The sleeve S may be made of a plurality of flat flexible metallic strips as shown in Figures 1 and 2, or alternatively sleeve S' as shown in Figures 3 and 12 may be made of a plurality of wire strands, the strips or strands being interwoven with each other about a common axis preferably on a mandrel having a diameter slightly less than the diameter of the hose H. The free end E or E' of the sleeve S or S', respectively, when moved toward the coupling to which the other end of the sleeve is secured causes the sleeve to expand radially to a diameter slightly larger than that of the hose H. When the sleeve is thus expanded as the preliminary step in decoupling operation, the hose may be withdrawn easily from the sleeve and over the end of the nipple. Conversely, assembly of the hose with the coupling may be readily accomplished by expanding the sleeve to a maximum diameter, inserting the hose into the sleeve S over the sealing member 8 and nipple N and thereafter with the hose shoved "home" on the coupling member preferably slightly elongating the sleeve to establish an initial grip of the sleeve on the hose. Repeated assembly and disassembly of the hose on and from the coupling may be effected without chewing, mutilating, weakening or otherwise deleteriously affecting the hose wall since the gripping force applied by the sleeve S or S' is distributed over a substantial portion of the peripheral area of the hose and actually exerts a low unit constricting pressure against the exterior of the hose. When the hose is subjected to working pressure and the hose wall expands outwardly in response thereto, only a limited area of outer surface of the hose is squeezed into the interstices of the weave of the sleeve, see Figure 5, and hence the physical condition of the exterior surface of the hose is substantially unaffected by the grip of the sleeve S or S' even when subjected to substantially high working pressures, for example up to 2500 p. s. i.

Since the expansible and contractile sleeves S and S' grip a relatively large area of the outer surface of the hose and consequently need to exert but a relatively low unit pressure on the hose in order to hold same to the coupling member, there will be substantially no "cold flowing" of the material of the hose wall whether it be wire or fabric reinforced high pressure hose or relatively soft thick-walled less strongly reinforced low pressure hose. This feature is of decided advantage since the life of the hose is thereby prolonged and its strength substantially unimpaired even under arduous working conditions as, for example, when the hose is subjected to continuous vibration and/or when the pressure of fluid in the hose is apt to change sharply. Essentially the contractile sleeve S, or S', exerts an effective hold on the hose without substantially reducing the wall thickness of the hose and avoids the necessity of constricting the hose so as to injure or damage it, as for example, by inducing deleterious cold flowing of the hose wall. The sleeve S or S' cooperate with the sealing member 8 by effectively confining and limiting the radial expansion and longitudinal movement of the hose relative to the rigid coupling member to a range within the elastic limits of the sealing member.

Figure 7:
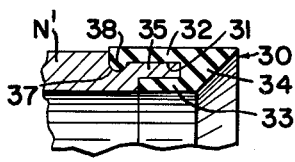

In the modified form of our invention shown in Figure 7 the sealing member 30 is formed to fit over the exterior as well as within the interior of the end of the nipple and has a central annular longitudinally extending cavity or recess 31 defined by annular outer and inner legs 32 and 33 which extend longitudinally from the unsupported or extension portion 34 of the sealing member. The recess 31 is adapted to receive the extreme outer end section 35 of the nipple N' so that the legs 32 and 33 snugly embrace and frictionally grip the outer and inner surfaces of the nipple. The end of the nipple N', like that of the above described embodiment, is counterbored to a radial depth equal to the thickness of inner leg 33 of the sealing member which therefore offers a minimum of resistance to the flow of fluid through the coupling. The nipple is also preferably formed with a reduced outside diameter to accommodate outer leg 32 of sealing member and thereby facilitate insertion of the nipple and sealing member into the bore of the hose. An external annular groove 37 on the nipple receives an enlarged portion or bead 38 on the inner or leftward as viewed end of outer leg 32 of the sealing member to secure and retain the latter in position on the end of the nipple. In other respects, sealing member 30 is similar to and functions essentially in the same manner as sealing member 8, the working pressure of the fluid in the coupling causing the member 30 to be urged and expanded tightly into engagement with the end section of the nipple as well as the interior of the hose to effect a fluid tight seal for the coupling.

Figure 8:
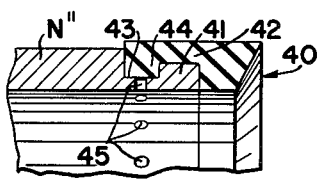

In the modified form of our invention shown in Figure 8, the resilient grommet or sealing member 40 is arranged to be mounted on the exterior rather than the interior of the nipple N", that is, opposite to the arrangement of the sealing member 8 shown in Figures 2 and 5. The outside diameter of end section 41 of the nipple N" is less than the rest of the nipple in order to accommodate the overlapping portion 42 of the sealing member and thereby facilitate insertion of the sealing member into the bore of the hose. An annular groove 43 formed externally in the nipple wall is adapted to receive a corresponding rib or flange 44 on the sealing member 40 to hold the latter on the nipple. In order to insure a fluid tight seal between the sealing member 40 and the nipple body, a plurality of arcuately spaced radial pressure apertures 45 are formed circumferentially in the portion of the nipple wall that forms the bottom of the annular groove 43. Thus, the pressure of the fluid carried within the hose acts through these pressure apertures 45 on the underside of the sealing member flange 44 and causes same to expand against the sides of groove 43 and complete the seal. It will be noted that fluid tight engagement between the overlapping portion 42 of member 40 and the portion of the nipple between the nipple end and the pressure apertures 45 is not critical, and thus separation of the sealing member 40 from the outer edge of the nipple as may occur when the sealing member expands and "follows" movement of the hose will not impair the effectiveness of the seal. In other respects sealing member 40 functions in the same manner as the forms described above in effecting a fluid tight seal between the nipple N" and the hose H.

Figure 9:
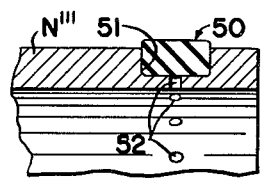

In the form of our invention shown in Figure 9, the sealing member 50 takes the form of a ring or band arranged to fit into an annular external groove 51 in the wall of nipple N'''. A series of circumferentially arranged arcuately spaced pressure holes or apertures 52 preferably are drilled or otherwise formed in the grooved part of the nipple wall as with modification illustrated in Figure 8 and described above. With this arrangement the working or service pressure of the fluid within the hose and nipple that acts through apertures 52 on the interior of ring 50 likewise causes the sealing member 50 to expand radially outwardly against adjacent portions of the bore of the hose as well as against the confining sides of the groove 51. Since the hose wall surrounding the nipple N''' and immediately adjacent the sealing member 50 is not directly exposed to the influence of the working or service pressure of the fluid in the system, this part of the hose will not expand radially outwardly but will tend to remain in close contact with the nipple and the sealing member 50 and thus enhance the seal. The effect of the fluid pressure in the hose acting through pressure holes 52 is to cause the sealing member 50 to mushroom outwardly against the hose wall already tightly formed on the nipple to make an effective fluid tight seal.

Figure 10:
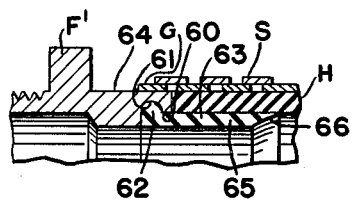

In the forms of our invention described above and illustrated in Figures 3 to 9 inclusive, the separate resilient sealing members are adapted to be mounted on the various nipples or inserts and disposed or inserted along with the nipple into the bore of the hose and thus in assembled position are spaced inwardly a substantial distance from the end of the hose. However, our invention may be practiced with a coupling constructed without a nipple or insert, that is, without a portion adapted to extend into the bore of the hose H. As shown in Figure 10, the fitting F' which forms a part of the rigid coupling does not extend into the bore of the hose H and preferably is counterbored as indicated at 60 and is formed with an internal annular groove 61 at the inner end of the counterbored portion to receive the beaded end or nose 62 of a cylindrical resilient sealing member 63. The fitting F' also has an external cylindrical surface 64 adjacent its end around which one end G of the braided expansible and contractile sleeve S is disposed and secured as by brazing or other mechanical means. The sleeve S thus is secured directly to the body of fitting F'. The resilient cylindrical sealing member 63 is adapted to be detachably connected to the interior of the fitting F' adjacent the end thereof and has an extension portion 65 which projects beyond the end of the fitting into the bore of the hose H. The outer end 66 of the extension portion 65 is conically shaped as in the above described modification. When the fitting is operatively assembled with the hose, the end of the hose is disposed within the braided sleeve S and is telescoped over the extension portion 65 of the sealing member 63 until the hose end abuts the end of the fitting, as shown in Figure 10. The sleeve S then preferably is slightly elongated manually to insure establishment of the preliminary or pre-operational grip on the hose, and the coupling is ready for use.

The extension portion 65 of sealing member 63 preferably is greater in length than the above described forms of the invention in order to maintain a fluid tight seal with the hose wall in spite of initial incremental longitudinal movements of the hose H relative to the fitting F'. In all other respects, the sealing member 63 is structurally the same as and functions in substantially the same manner as sealing member 8 described above and provides an effective fluid tight seal for the coupling. The braided sleeve preferably is the same as either sleeve S or sleeve S' described above, and functions as an external constraining means on the hose wall to resist and limit radial expansion and longitudinal movement of the hose relative to the coupling member and thus cooperates with sealing member 63.

In the modified form of our invention shown in Figure 11, the resilient grommet or sealing member 70 preferably is arranged to be permanently molded or bonded to the end of nipple N⁴ rather than being detachably connected as heretofore described. Such a construction is preferable for although not limited to applications requiring small diameter hose, say 3/16" or less. Sealing member 70 in effect becomes a substantially permanent resilient extension of nipple N⁴. The end surface 71 of the nipple N⁴ preferably is machined or otherwise formed at a suitable angle to provide sufficient area of surface for bonding the sealing member 70 thereto. The sealing member 70 preferably is molded about the end of the nipple as shown with a portion 72 thereof extending around the cylindrical external surface of the nipple to enhance bond therebetween. The sealing member 70 preferably has a conically shaped end surface 73 and functions essentially in the same manner as the other forms of sealing members described above having conically formed ends.

As mentioned above with reference to Figure 3, the expansible and contractile braided sleeve S' is formed from wire strands woven into a sheath for the purpose explained. We prefer that the free end E' of the sleeve S' as shown in Figure 3 be rolled back to prevent fraying of the end and to provide a rigid integral collar by which the sleeve may be grasped and contracted by the operator when the hose is disassembled from the coupling. In Figures 12, 13 and 14, we have shown a modification of the sleeve S'' wherein both ends E''—E'' thereof are rolled backwardly to form integral collars and wherein the collar C'' of the rigid coupling member is arranged to be crimped over and thus secured to one of the sleeve ends as shown in Figure 13, or two identical collars C'' are thus secured to both ends E''—E'' as shown in Figure 14. In order to form these integral bent over ends on the braided sleeves, we prefer to use a ring-like mandrel having a diameter slightly larger than the O. D. of the hose H so that the sleeve ends E'' roll outwardly whereby to facilitate entry of the hose into the sleeve. The balance of the sleeve is formed on a cylindrical mandrel having a diameter less than the O. D. of hose H so that the sleeve S'' when telescoped over the hose will exert an initial radial gripping force on the outer surface of the hose throughout the whole length of the sleeve. Alternatively, the sleeve may be formed on a mandrel having a longitudinally tapering or conical surface, the diameter at the smaller end being less than the O. D. of the hose whereby the small end of the sleeve formed thereon when slipped over the hose will contract on and initially grip the hose.

In Figures 13 and 14, we have shown an alternative form of connection of the braided sleeve S'' to the collar or collars C'' rigid coupling member. Preferably the end of the collar has a rounded annular recess 90 for receiving the bent over end E'' of the sleeve and an overhanging outside flange 91 which is adapted to be crimped down and over the sleeve end to secure same within the collar recess. The radius of curvature of recess 90 is slightly less than the roll radius of the sleeve end so that the latter is constricted into a tighter roll or bead when inserted in and confined within the recess. We prefer that the inner wall 92 of the collar C'' adjacent the recess 90 be conically shaped to facilitate entry of the sleeve end E'' into the recess prior to crimping the flange 91 thereover. This method of attaching the sleeve S'' to the rigid coupling member is particularly effective for applications where brazing is not desirable as with aluminum braid, or with certain fittings or braids which become xcessively annealed through brazing heat. The braided sleeve S'' functions essentially in the same manner as described for sleeves S and S', gripping the hose under pressure and thus preventing the fitting from blowing off, and also cooperating and assisting in the sealing function of the grommet. The form of coupling shown in Figure 14 is particularly effective on short pieces of hose especially where the hose is too short to admit the use of a separate sleeve on each end with practicability. This form is also particularly effective on relatively long hoses which require reinforcement and, additionally, protection against external abrasive action.

Modifications and changes to the above described and illustrated preferred forms and embodiments of our invention may occur to those skilled in the art without departing from the spirit and scope of our invention. We therefore do not wish to be limited to these preferred embodiments of our invention, nor in any manner inconsistent with the advance which our invention marks over the prior art.

We claim:

1. In combination with a hose, a reusable coupling for said hose, comprising a rigid fitting having an externally threaded part and an integral elongated nipple extending axially from the threaded part, the outer end of said nipple being axially spaced from said threaded part of said fitting, a nut threaded on said threaded part of said fitting, a braided expansible and contractible sleeve permanently secured to said nut, said sleeve extending concentrically of and axially beyond the outer end of the nipple and being radially spaced from said nipple a distance substantially equal to the thickness of the wall of the hose, an annular resilient sealing member supported on the outer end of the nipple and axially spaced inwardly from the outer end of said sleeve and having internal and external diameters at least as large as the internal and external diameters, respectively, of said nipple, said hose extending over said nipple and said sealing member and within said braided sleeve, said sealing member engaging the interior of the hose and sealing the nipple to the hose, said braided sleeve engaging and gripping the exterior of said hose for mechanically holding the hose on said fitting.

2. A reusable coupling for a hose, comprising a rigid tubular member, a nut removably connected to said tubular member intermediate the ends of the member, a braided expansible and contractible sleeve connected to said nut and extending concentrically of and beyond one end of said member, said sleeve being radially spaced from said one end of said member by a distance substantially equal to the thickness of the wall of the hose with which the coupling is used, an annular resilient sealing member connected to said one end of said tubular member, said sealing member having internal and external diameters at least as large as the internal and external diameters, respectively, of said one end of said tubular member, said sealing member being disposed within one end of the hose and engaging the interior of the hose and sealing the tubular member to the hose, said braided sleeve extending over and engaging and gripping the exterior of the hose for mechanically holding the hose on the tubular member.

3. A reusable coupling for a hose, comprising a rigid tubular member, an annular resilient sealing member on one end of said tubular member, a nut threaded on said tubular member and axially spaced from said sealing member, a braided expansible and contractible sleeve connected to said nut and extending concentrically of and axially beyond said sealing member, said sleeve being radially spaced from said sealing member by an amount substantially equal to the thickness of the wall of the hose, the hose when assembled with said coupling extending over said tubular and sealing members within said braided sleeve and terminating behind the point of connection of said nut to said tubular member, said sealing member engaging the interior of the hose and sealing the tubular member to the hose, said braided sleeve gripping the exterior of the hose and mechanically holding the hose on said tubular member.

4. A reusable coupling for a hose, comprising a tubular member, an annular resilient sealing member on one end of the tubular member, a nut threaded on said tubular member intermediate the ends thereof, a braided expansible and contractible sleeve connected to said nut and circumscribing and being radially spaced from said sealing member, said radial spacing being substantially equal to the hose wall thickness, said sleeve having a predetermined length greater than the axial spacing between said nut and said sealing member whereby said sleeve extends axially beyond said sealing member.

5. A reusable coupling for a hose, comprising a rigid tubular member, an annular resilient sealing member on one end of the tubular member, said tubular member being partially insertable within an end of said hose to permit engagement of said sealing member with the interior of the hose, a braided expansible and contractible sleeve releasably engageable with the periphery of the hose, anchoring means releasably connected directly to said tubular member, said sleeve being connected to said anchoring means and extending axially beyond and concentrically of said one end of the tubular member and being radially spaced from said sealing member by an amount substantially equal to the wall thickness of the hose with which the coupling is used.

References Cited in the file of this patent

UNITED STATES PATENTS

| | | |
|---|---|---|
| 794,110 | McDowell | July 4, 1905 |
| 1,294,921 | Lewis | Feb. 18, 1919 |
| 1,808,094 | Yackey | June 2, 1931 |
| 1,862,153 | Lee | June 7, 1932 |
| 1,982,732 | Fletcher | Dec. 4, 1934 |
| 2,143,985 | Kellems | Jan. 17, 1939 |
| 2,363,586 | Guarnaschelli | Nov. 28, 1944 |
| 2,416,657 | Trevaskis | Feb. 25, 1947 |
| 2,477,533 | Whiting | July 26, 1949 |